No. 884,794. PATENTED APR. 14, 1908.
L. N. CATES.
PROTECTING CASING FOR TIRES.
APPLICATION FILED JUNE 15, 1907.

WITNESSES:

INVENTOR.
Lorwin N. Cates
BY
ATTORNEY.

UNITED STATES PATENT OFFICE.

LORWIN N. CATES, OF ST. LOUIS, MISSOURI.

PROTECTING-CASING FOR TIRES.

No. 884,794.

Specification of Letters Patent.

Patented April 14, 1908.

Application filed June 15, 1907. Serial No. 379,188.

*To all whom it may concern:*

Be it known that I, LORWIN N. CATES, citizen of the United States, residing at St. Louis, State of Missouri, have invented certain new and useful Improvements in Protecting-Casings for Tires, of which the following is a full, clear, and exact description, reference being had to the accompanying drawings, forming a part hereof.

My invention has relation to improvements in protecting casings for pneumatic tires; and it consists in the novel construction of casing more fully set forth in the specification and pointed out in the claims.

Figure 1:
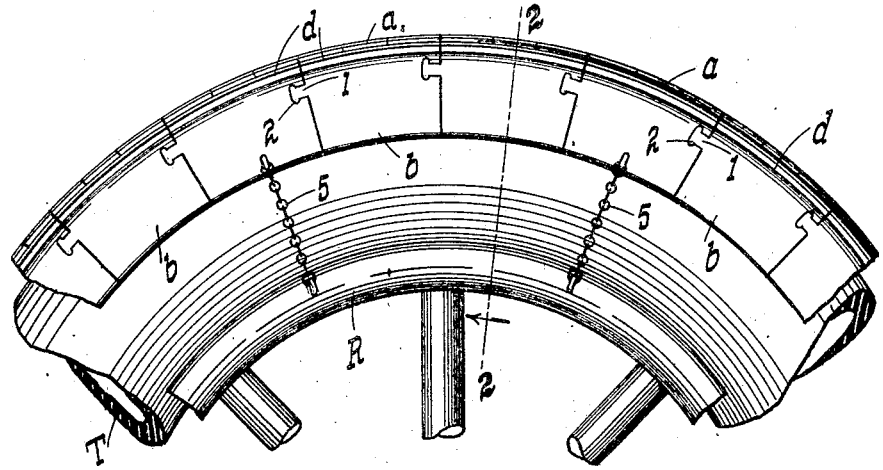
Figure 2:
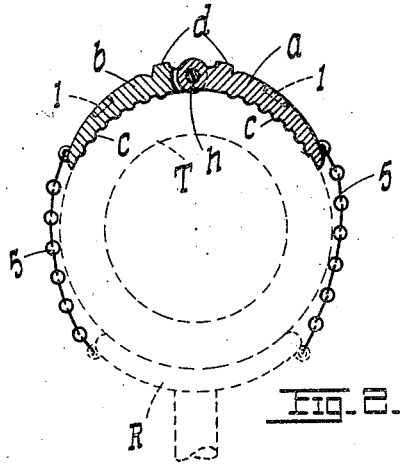
Figures 3, 4:
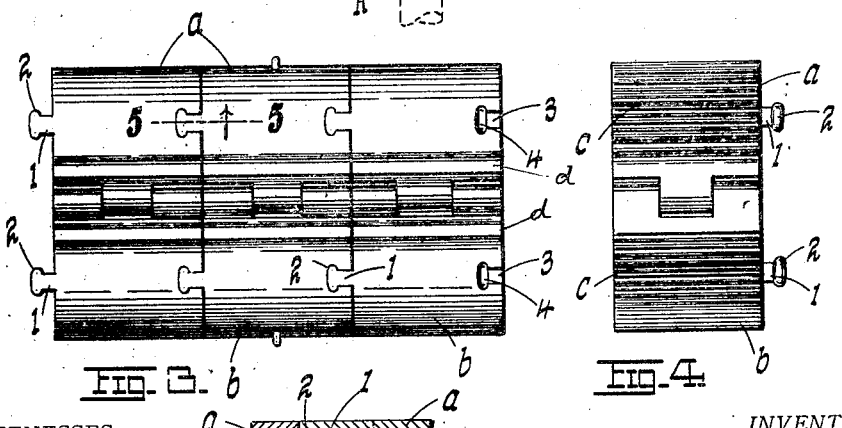
Figure 5:

In the drawings, Figure 1 is a side elevation of a portion of a pneumatic tire showing my invention applied thereto; Fig. 2 is a cross section on the line 2—2 of Fig. 1, the rim and tire being shown dotted; Fig. 3 is a face view of three pair of interlocking sections entering into the construction of my casing; Fig. 4 is an inside view of one pair of sections; and Fig. 5 is a sectional detail on the line 5—5 of Fig. 3.

The object of my invention is to provide a pneumatic tire with an outer casing which shall serve as the tread for the wheel thereby protecting the pneumatic or air-inflated section against puncture or destruction.

A further object is to construct a casing which will be eminently pliable and yielding, readily conforming to the compressions to which the inflated portion is subjected under the load which it carries and the strains to which it is subjected; one which can be readily applied to the tire, and one possessing further and other advantages better apparent from a detailed description of the invention which is as follows:

Referring to the drawings, R, represents the rim and T, the pneumatic tire thereof as usual in automobile constructions. The protecting casing enveloping the outer portion of the periphery of the tire, and forming the tread of the wheel, is composed of a series of sections $a$ hinged to a series of sections $b$, the hinge pin $h$ being shown in section in Fig. 2. The inner surfaces of the sections $a$, $b$ are provided with parallel ribs or corrugations $c$ so as to better grip the tire, the said sections having formed similar ribs $d$ on their outer faces on each side of the hinge axis, whereby a firm purchase is insured as the wheel is passing over the ground, and slipping is avoided. Projecting from one edge of each section and disposed parallel to the plane of rotation of the wheel, is a tongue 1, terminating in a transverse rounded enlargement or head 2, the adjacent section having formed a groove 3 and socket 4 for the respective reception of said tongue and head, whereby the members of each hinged pair of sections become interlocked in lines parallel to the rotation of the wheel, the sections being disposed about hinge-axes occupying the tread portion of the wheel. The pairs of sections are thus passed over the tire until the space between the end sections is just sufficient to admit the final pair or "key", whereupon the operation is complete. A sufficient number (or all) of the sections are connected to the rim by chains 5 extending from the outer edges of the sections to the edge of the rim (Figs. 1; 2) so that there shall be no danger of the sections working out and becoming disengaged from the tire.

The weight which any wheel must support will spread the bottom pair of sections in its rotation, the sections oscillating (opening more or less) under such weight about their hinge axis, and closing in on the tire as they leave the ground with the wheel's rotation. Again, the several sections freely conform to any curvature which the wheel may assume under the compression which the tire suffers, by virtue of the freedom with which any pair of sections rock about their interlocking pair, it being understood that the heads 2 form fulcrums in the pockets or sockets 4 about which any member $a$, $b$ is free to oscillate (in planes parallel to the wheel's rotation, or at right angles to the hinge axis between the members of any pair of sections).

The sections of the casing are thus yielding both in the general plane of the wheel and at right angles thereto, so that no inconvenience is suffered by the occupant of the vehicle. Of course these oscillations of the sections are very slight and for a wheel of large diameter would be scarcely noticeable, unless it be the transverse oscillations under a heavy load. Should these become excessive the chains 5 would arrest them and thus prevent any section from extricating itself from the tire. These sections are made of steel and wear for an indefinite period of time, and prolong the life of the pneumatic tire to a degree scarcely attainable with any other form of casing.

Having described my invention what I claim is

A tire-casing composed of series of pairs of sections hinged together along the outer edge or tread of the wheel, tongues projecting from the sections on opposite sides of the hinge-line, and sockets formed in the contiguous sections for receiving said tongues and thus interlocking with the sections carrying said tongues, substantially as set forth.

In testimony whereof I affix my signature, in presence of two witnesses.

LORWIN N. CATES.

Witnesses:
EMIL STAREK,
T. EVANS.